(12) United States Patent
Han et al.

(10) Patent No.: US 8,293,095 B2
(45) Date of Patent: Oct. 23, 2012

(54) MICROFLUIDIC DEVICE FOR ELECTRICALLY REGULATING THE PH OF A FLUID THEREIN AND METHOD OF REGULATING THE PH OF A FLUID IN A MICROFLUIDIC DEVICE USING THE SAME

(75) Inventors: Jung-im Han, Seoul (KR); Joon-ho Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1535 days.

(21) Appl. No.: 11/472,182

(22) Filed: Jun. 21, 2006

(65) Prior Publication Data
US 2007/0068813 A1 Mar. 29, 2007

(30) Foreign Application Priority Data
Jun. 21, 2005 (KR) .................. 10-2005-0053553

(51) Int. Cl.
*G01N 27/44* (2006.01)
(52) U.S. Cl. ................ 205/787.5; 204/433
(58) Field of Classification Search .......... 204/400, 204/610, 548, 459, 644, 600, 413, 433; 205/775, 205/787.5, 789, 789.5
See application file for complete search history.

(56) References Cited

U.S. PATENT DOCUMENTS

| | | | |
|---|---|---|---|
| 4,049,519 A | * | 9/1977 | Sloan .................. 205/99 |
| 4,152,215 A | | 5/1979 | Yoshino et al. |
| 5,304,430 A | * | 4/1994 | Ludwig .................. 429/17 |
| 6,129,832 A | | 10/2000 | Fuhr et al. |

FOREIGN PATENT DOCUMENTS

| | | |
|---|---|---|
| JP | 1978-62637 | 6/1978 |
| JP | 62-272150 A | 11/1987 |
| JP | 08-127887 A | 5/1996 |
| JP | 2000-501173 A | 2/2000 |
| JP | 2005-283193 A | 10/2005 |
| JP | 2006-166916 A | 6/2006 |
| JP | 2006-171005 A | 6/2006 |
| JP | 2006-175360 A | 7/2006 |

OTHER PUBLICATIONS

Shimomura, O.; "Fast growth and evaluation of potassium dihydrogen phosphate single crystals by electrodialysis with pH control"; Journal of Crystal Growth; vol. 144; pp. 253-257; Dec. 1994.
European Search Report dated Aug. 20, 2007 for Application No. 06009850.6.

* cited by examiner

*Primary Examiner* — Alex Noguerola
*Assistant Examiner* — Gurpreet Kaur
(74) *Attorney, Agent, or Firm* — Cantor Colburn LLP

(57) ABSTRACT

Provided is a microfluidic device for electrically regulating the pH of a fluid comprising: a first chamber comprising a first electrode; a second chamber comprising a second electrode; a third chamber comprising a third electrode, a metal ion exchange membrane between the first and second chambers; and a hydrogen ion exchange membrane between the first or second chamber and the third chamber.

5 Claims, 4 Drawing Sheets

SEQUENCE LISTING

```
<160> NUMBER OF SEQ ID NOS: 2

<210> SEQ ID NO 1
<211> LENGTH: 20
<212> TYPE: DNA
<213> ORGANISM: Artificial Sequence
<220> FEATURE:
<223> OTHER INFORMATION: Forward primer
<220> FEATURE:
<221> NAME/KEY: misc_feature
<222> LOCATION: (1)
<223> OTHER INFORMATION: labeled with Cy3 at 5' terminus

<400> SEQUENCE: 1
yccakactcc tacgggaggc                                              20

<210> SEQ ID NO 2
<211> LENGTH: 22
<212> TYPE: DNA
<213> ORGANISM: Artificial Sequence
<220> FEATURE:
<223> OTHER INFORMATION: reverse primer
<220> FEATURE:
<221> NAME/KEY: misc_feature
<222> LOCATION: (1)
<223> OTHER INFORMATION: labeled with Cy3 at 5' terminus

<400> SEQUENCE: 2
gtattaccgc rrctgctggc ac                                           22
```

MICROFLUIDIC DEVICE FOR ELECTRICALLY REGULATING THE PH OF A FLUID THEREIN AND METHOD OF REGULATING THE PH OF A FLUID IN A MICROFLUIDIC DEVICE USING THE SAME

CROSS-REFERENCE TO RELATED PATENT APPLICATION

This application claims the benefit of Korean Patent Application No. 10-2005-0053553, filed on Jun. 21, 2005, in the Korean Intellectual Property Office, the disclosure of which is incorporated herein in its entirety by reference.

BACKGROUND OF THE INVENTION

1. Field of the Invention

The present invention relates to a microfluidic device for electrically regulating the pH of a fluid therein and a method of regulating the pH of a fluid in a microfluidic device using the same.

2. Description of the Related Art

Microfluidic devices are devices in which an inlet, an outlet, a reaction chamber, etc., are interconnected through microchannels. Such devices are widely known in the field and are used in micro-analytic devices, such as a lab-on-a-chip (LOC). In addition to microchannels, a micropump for inducing the flow of fluid, a micromixer for mixing fluids, a microfilter for filtering a fluid, etc., may be included in microfluidic devices.

A microfluidic device used as a biological analytic device, such as a LOC, performs a series of biological analytic processes including cytolysis, nucleic acid amplification and separation, for example, a polymerase chain reaction (PCR), and protein separation and detection. A conventional pH regulating process involved in such biological analysis processes includes adding or removing an acidic solution, a neutral solution, or a buffer solution. However, when adding or removing a pH-adjusting solution in a microfluidic device, problems associated with dilution, mixing and the flow of a substance in a microchannel may arise because a small amount of a sample is used. Furthermore, the added pH-adjusting material may inhibit subsequent biological analysis processes. In this case, the pH-adjusting material has to be removed.

A method of adjusting the pH using electrolysis can be considered as a solution to the above conventional problems associated with the injecting pH-adjusting reagent. In the method, a microfluidic device includes an electrode and a chamber in which water can be electrolyzed. When a voltage is applied to the chamber, water is electrolyzed. Accordingly, the pH can be regulated by hydrogen ions generated by the anode and hydroxide ions generated by the cathode. However, when negatively charged biological molecules such as nucleic acids are absorbed into the positive electrode, the absorbed molecules generally become unstable and the efficiency of the process can deteriorate. The inventors of the present invention found a method of regulating the pH in a microfluidic device using electrolysis of water and preventing materials such as nucleic acids from being absorbed into the positive electrode to which a voltage is applied, and thus increasing the efficiency of the process by increasing the stability of the nucleic acids, etc.

SUMMARY OF THE INVENTION

The present invention provides a microfluidic device capable of regulating the pH of a fluid through electrolysis and increasing the stability of a biological molecule absorbed by a positive electrode to which a voltage is applied.

The present invention also provides a method of regulating the pH of a fluid in the microfluidic device through electrolysis and increasing the stability of the biological molecule absorbed by a positive electrode to which a voltage is applied using the microfluidic device.

According to an aspect of the present invention, there is provided a microfluidic device for electrically regulating the pH of a fluid comprising:
a first chamber comprising a first electrode;
a second chamber comprising a second electrode;
a third chamber comprising a third electrode,
a metal ion exchange membrane between the first and second chambers; and
a hydrogen ion exchange membrane between the first or second chamber and the third chamber.

According to another aspect of the present invention, there is provided a method of electrically regulating the pH of a fluid in the microfluidic device of the present invention, the method comprising:
injecting a solution containing an ion having a lower standard oxidation potential than water into the first chamber;
injecting a solution containing an ion having a lower standard reduction potential than water into the second chamber; and
applying a voltage between the first electrode of the first chamber or the second electrode of the second chamber and the third electrode of the third chamber, thereby regulating the pH of a solution in the first or second chamber.

According to another aspect of the present invention, there is provided a method of electrically regulating the pH of a fluid in a microfluidic device of the present invention, the method comprising:
injecting a solution containing an ion having a lower standard oxidation potential than water into the first chamber;
injecting a solution containing an ion having a lower standard reduction potential than water into the second chamber;
applying a voltage between the first electrode of the first chamber and the second electrode of the second chamber to induce electrolysis of water in the first and second chambers; and
applying a voltage between the first electrode of the first chamber or the second electrode of the second chamber and the third electrode of the third chamber, wherein the voltage applied to the first or second electrode is opposite to the voltage previously applied to the first or second electrode, thereby regulating the pH of a solution in the second or first chamber.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
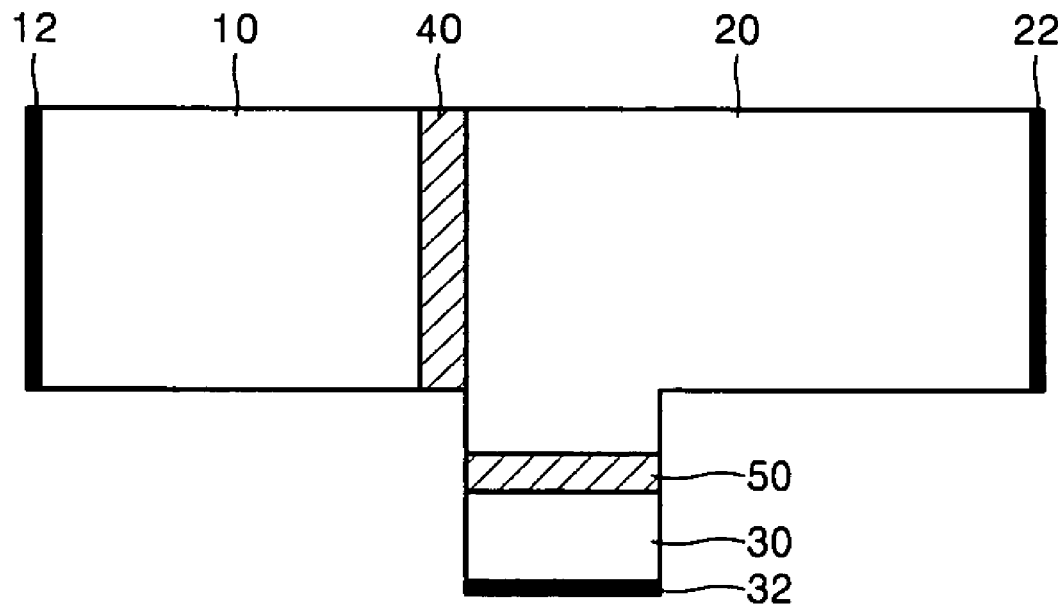
FIG. 1 is a schematic diagram of a microfluidic device according to an embodiment of the present invention.

A microfluidic device for electrically regulating the pH of a fluid according to an embodiment of the present invention includes: a first chamber including a first electrode; a second chamber including a second electrode; a third chamber including a third electrode; a metal ion exchange membrane between the first and second chambers; and a hydrogen ion exchange membrane between the first or second chamber and the third chamber.

The first, second and third chambers are chambers capable of containing materials such as a fluid, and may be microchambers containing materials having the volume of the microunit or less. The chambers are interconnected to various chambers through microchannels. For example, the chambers can be interconnected to a receiving chamber accommodating biological samples such as cells, a pretreatment chamber pre-treating the samples, an amplification chamber amplifying nucleic acids, a chamber separating the nucleic acids and a chamber detecting the nucleic acids. Thus, the microfluidic device can be a lab-on-a-chip (LOC) electrically regulating the pH of the fluid.

The metal ion exchange membrane is interposed between the first and second chambers. Additionally, the hydrogen ion exchange membrane is interposed between the first or second chamber and the third chamber. Herein, the metal ion exchange membrane and/or the hydrogen ion exchange membrane may form the entirety or a part of the membrane interposed between the chambers Accordingly, a portion of the first and second chambers may be composed of the metal ion exchange membrane and a portion of the third chamber may be composed of the hydrogen ion exchange membrane.

The metal ion exchange membrane may be an alkali metal ion exchange membrane. The metal ion may be $Li^+$, $Na^+$, $K^+$, $Ca^{2+}$, $Mg^{2+}$ or $Al^{3+}$ etc., but is not limited thereto. The metal ion exchange membrane may be a sodium ion exchange membrane, for example a membrane composed of Nafion™ (Nafion Company). The metal ion exchange membrane may contain a functional group having —$SO_3M$ or —COOM, or —$SO_3M$ and —COOM on its surface, wherein M is a metal, for example, an alkali metal. However, the structure of the metal ion exchange membrane is not limited thereto.

The hydrogen ion exchange membrane may contain a functional group having —$SO_3M$ or —COOM, or —$SO_3M$ and —COOM on its surface. However, the structure of the hydrogen ion exchange membrane is not limited thereto.

The electrodes in the chambers may include conventional materials known in the field such as platinum, gold, copper and palladium. The electrode may be formed on a side wall of the chamber, but its position is not limited thereto. The first electrode of the first chamber and the second electrode of the second chamber may face each other with a predetermined angle therebetween, and the metal ion exchange membrane is disposed between the first and second electrodes. The first electrode of the first chamber or the second electrode of the second chamber and the third electrode of the third chamber may face each other with a predetermined angle therebetween, and the metal ion exchange membrane and/or hydrogen ion exchange membrane is disposed between the first or second electrode and the third electrode.

FIG. 1 is a schematic diagram of a microfluidic device according to an embodiment of the present invention. As illustrated in FIG. 1, the microfluidic device includes a first chamber 10 with a first electrode 12 and a metal ion exchange membrane 40 on opposite sides thereof, a second chamber 20 with a second electrode 22 and the metal ion exchange membrane 40 on opposite sides thereof, and a third chamber with a third electrode 32 and a hydrogen ion exchange membrane 50 on opposite sides thereof. pH regulation according to a method of the present invention is achieved through the following process. A voltage is applied between the first and second electrodes, for example a positive voltage is applied to the first electrode and a negative voltage is applied to the second electrode. Then, electrolysis of water is induced in the first and second chambers so that the first chamber solution becomes acidic and the second chamber solution becomes alkaline. A voltage is applied between the first and third electrodes, for example a negative voltage is applied to the first electrode and a positive electrode is applied to the third electrode. By inducing the electrolysis of water, the pH of the first and second chambers can be regulated. The regulation of the pH may depend on the direction, magnitude and period of time of the applied voltage.

A method of electrically regulating the pH of a fluid in a microfluidic device according to an embodiment of the present invention includes: injecting a solution containing an ion having a lower standard oxidation potential than water into the first chamber; injecting a solution containing an ion having a lower standard reduction potential than water into the second chamber; and applying a voltage between the first electrode of the first chamber or the second electrode of the second chamber and the third electrode of the third chamber, thereby regulating the pH of a solution in the first or second chamber.

A method of electrically regulating the pH of a fluid in a microfluidic device according to another embodiment of the present invention includes: injecting a solution containing an ion having a lower standard oxidation potential than water into the first chamber; injecting a solution containing an ion having a lower standard reduction potential than water into the second chamber; applying a voltage between the first electrode of the first chamber and the second electrode of the second chamber to induce electrolysis of water in the first and second chambers; and applying a voltage between the first electrode of the first chamber or the second electrode of the second chamber and the third electrode of the third chamber, wherein the voltage applied to the first or second electrode is opposite to the previously applied voltage, thereby regulating the pH of a solution in the second or first chamber.

The regulation of the pH may depend on the direction, magnitude and period of time of the applied voltage.

The ion having a lower standard oxidation potential than water may contain at least one ionic compound among $NO_3^-$, $F^-$, $SO_4^{2-}$, $PO_4^{3-}$, and $CO_3^{2-}$ etc., but the ionic compound is not limited thereto. The ion having a lower standard reduction potential than water may contain at least on ionic compound among $Li^+$, $Na^+$, $K^+$, $Ca^{2+}$, $Mg^{2+}$ and $Al^{3+}$, etc.

Figure 2:
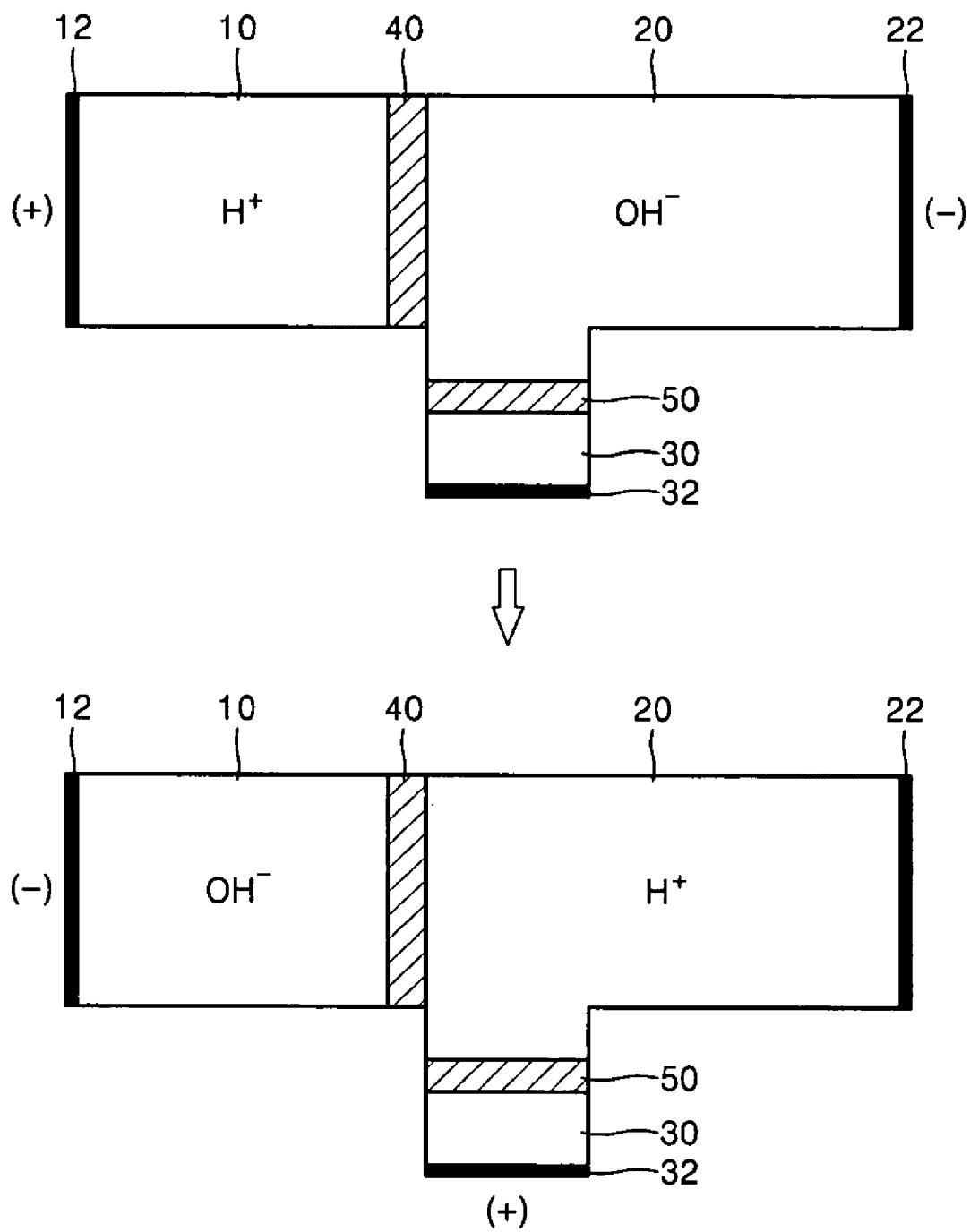
FIG. 2 illustrates a process of electrically regulating the pH of a fluid in a microfluidic device using the microfluidic device of FIG. 1 according to an embodiment of the present invention.

FIG. 2 illustrates a process of electrically regulating the pH of a fluid in a microfluidic device using the microfluidic device according to an embodiment of the present invention. As illustrated in FIG. 2, first, a solution containing $Na_2SO_4$ is added to the first chamber 10, the second chamber 20, and the third chamber 30. Next, a positive voltage is applied to the first electrode 12 and a negative voltage is applied to the second electrode 22 to induce electrolysis in the first chamber 10 and the second chamber 20. The ions generated by the electrolysis cannot pass through the metal ion exchange membrane 40. Thus, oxygen gas and hydrogen ions are generated in the first chamber 10 as a result of the electrolysis of water, and accordingly the solution becomes acidic, and hydrogen gas and hydroxide ions are generated in the second chamber 20 as a result of the electrolysis of water, and accordingly the solution becomes alkaline. The increased concentration of the hydroxide ions can be used for the lysis of biological samples such as cells. The change in the pH of the solutions of the first chamber 10 and the second chamber 20 through the electrolysis of water can be regulated by applying an appropriate voltage between the first electrode 12 and the third electrode 32. That is, when a negative voltage is applied to the first electrode 12 and a positive voltage is applied to the third electrode 32, oxygen gas and hydrogen ion are generated in the third chamber 30 as a result of the electrolysis of water, and accordingly the solution is acidic. The hydrogen ions in the third chamber 30 transfer to the second chamber 20 through the hydrogen ion exchange membrane 50 and make the solution of the second chamber 20 acidic. Additionally, hydrogen gas and hydroxide ions are generated in the first chamber 10 as a result of the electrolysis of water, and accordingly the solution is alkaline. Thus, the pH of the solutions in the first chamber 10 and the second chamber 20 can be regulated.

In of the method illustrated in FIG. 2, the pH is regulated through the electrolysis performed in the first and second chamber solutions and additional electrolysis performed by applying a voltage between the first and third electrodes. However, the electrolysis in the first and second chamber solutions is not necessarily needed. The pH of the first and second chambers can be regulated through the electrolysis of water when solutions injected into the first and second chambers have predetermined pH levels and a voltage is applied between the first and third chambers.

The present invention will be described in greater detail with reference to the following examples. The following examples are for illustrative purposes and are not intended to limit the scope of the invention.

EXAMPLE

Example 1 pH Regulation Based on the Electrolysis of Water Using Hydrogen Ion Exchange Membrane Electrolysis was performed using a sodium ion exchange membrane and a hydrogen ion exchange membrane to identify pH regulation of each chamber.

Figure 3:
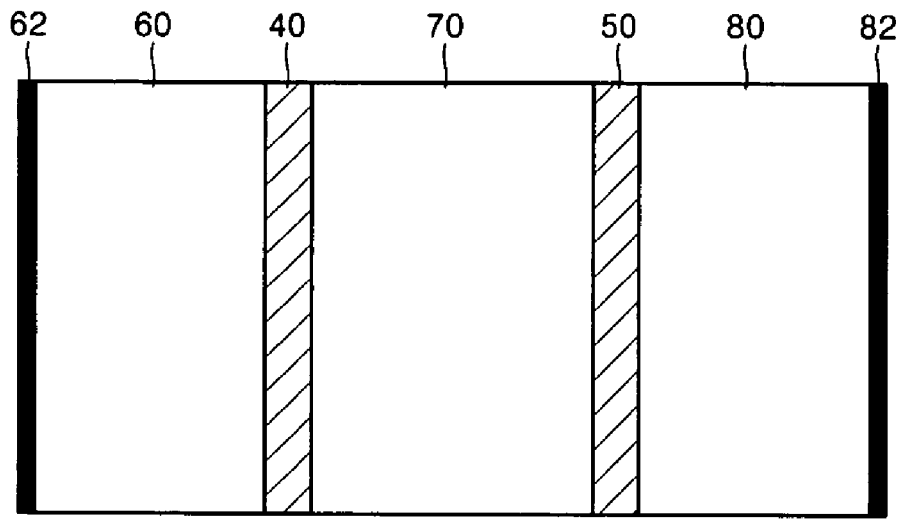
FIG. 3 is a schematic diagram of a microfluidic device according to an embodiment of the present invention.

FIG. 3 is a schematic diagram of a microfluidic device used in Example 1 according to an embodiment of the present invention. As illustrated in FIG. 3, the microfluidic device included: a first chamber 60 with a first electrode 62 and a sodium ion exchange membrane 40 at opposite ends thereof; a second chamber 70 with the sodium ion exchange membrane 40 and a hydrogen ion exchange membrane 50 at opposite ends thereof; and a third chamber 80 with the hydrogen ion exchange membrane 50 and a second electrode at opposite ends thereof. The sodium ion exchange membrane 40 and hydrogen ion exchange membrane 50 were composed of Nafion™, and respectively included a functional group of —$SO_3Na$ and —$SO_3H$ on their surfaces. The size of each of the membranes was 2 mm×2.5 mm. The volume of each chamber of the microfluidic device in FIG. 3 was 10 µl. Each of the first and second electrodes 62 and 82 had an area of 2 mm×2.5 mm and were composed of platinum.

First, the first chamber was filled with 10 µl of an aqueous solution (pH 6.0) containing 55 mM $Na_2SO_4$ and then the second and third chambers were filled with 10 µl of the aqueous solution (pH 6.0) containing 55 mM $Na_2SO_4$. Some hydrogen ions on the hydrogen ion exchange membrane were substituted by sodium ions and the hydrogen ion exchange membrane was washed with 55 mM $Na_2SO_4$ to adjust the pH to 3.0. A micro pH electrode manufactured by Orion and a pH test paper was used for the pH measurement. Next, a positive voltage was applied to the first electrode 62 and a negative voltage was applied to the second electrode 82. The pH of the chambers was measured after 5 V was applied for 50 seconds. The measured pH of the first chamber 60, the second chamber 70 and the third chamber 80 were respectively 1, 6 and 13 (refer to Table 1).

TABLE 1

| Chamber | First Chamber | Second Chamber | Third Chamber |
|---------|---------------|----------------|---------------|
| pH      | 1             | 6              | 13            |

As shown in Table 1, when the voltage was applied between the first electrode 62 and the second electrode 82, the fluid in the first chamber 60 became acidic and the fluid in the third chamber 80 became alkaline. The changes in the pH in the first chamber 60 and the third chamber 80 are assumed to have been caused by the electrolysis of water. That is, oxygen gas and hydrogen ions were generated in the first chamber 60 as a result of the electrolysis of water, and accordingly the solution was acidic, and hydrogen gas and hydroxide ions were generated in the third chamber 80 as a result of the electrolysis of water, and accordingly the solution was alkaline. The solution in the second chamber 70 is assumed to have become alkaline since the hydrogen ions balanced by the hydrogen ion exchange membrane 50 between the second chamber 70 and the third chamber 80 were removed through the reaction with the hydroxide ions in the third chamber 80. Additionally, a pH of 13 in the third chamber 80 was sufficient for alkaline lysis. Thus, when a sample including cells or a virus was injected into the third chamber 80 and a voltage was applied as described above, contents such as nucleic acids could be extracted from the cells or the virus as a result of the lysis. However, some biological molecules such as nucleic acids can be destroyed when exposed to pH 13 for more than a predetermined period of time. Therefore, the pH needs to be regulated to a desired level through the following processes.

For this purpose of regulating pH, a method of applying a voltage which is opposite to the voltage previously applied to the electrodes can be considered. That is, when a negative voltage was applied to the first electrode 62 and a positive voltage was applied to the second electrode 82, the solution in the first chamber was alkaline and the solution in the third chamber was acidic. As a result, a desired pH can be achieved. However, since a positive voltage was applied to the second electrode 82 of the third chamber 80, anionic materials such as nucleic acids were absorbed by the second electrode 82. The absorbed anionic materials may have unstable structures and thereby inhibit subsequent experiments.

Thus, it was assumed that a hydrogen ion exchange membrane could be installed between the second electrode 82 to which the positive voltage was applied and the third chamber solution to solve the problem. To confirm this assumption, 10 µl of the solution (pH 6) in the second chamber 70 was removed, 10 µl of the solution (pH 13) of the third chamber 80 was moved in the empty second chamber 70, and 10 μl of an aqueous solution (pH 6.5) containing 55 mM Na$_2$SO$_4$ was put into the empty third chamber 80. A hydrogen ion exchange membrane was installed between the third chamber solution having pH 13, which is now the second chamber solution and the second electrode 82. Then, a negative voltage was applied to the first electrode and a positive voltage was applied to the second electrode. The pH of the chambers was measured using a micro pH electrode manufactured by Orion and a pH test paper after 10 V was applied for 20 seconds. The measured pH of the first, second and third chambers were respectively 13, 2.5 and 1 (refer to Table 2).

TABLE 2

| Chamber | First chamber | Second chamber | Third chamber |
|---|---|---|---|
| PH | 13 | 2.5 | 1 |

As shown in Table 2, the hydrogen ion exchange membrane between the second and third chambers prevented anionic materials such as nucleic acids from adhering to the second electrode 82 and regulated the pH of the second chamber from 13 to 2.5. At pH 2.5, a nucleic acid separation method including binding nucleic acids to a solid ion exchange material having a positive charge in an acidic pH, changing the pH to alkaline and eluting the nucleic acids can be performed without further adjustment of the pH.

Example 2

Influence of pH Regulation Based on the Electrolysis of Water Using Hydrogen ion Exchange Membrane on Stability of Nucleic Acids The influence of pH regulation through the electrolysis of water using a hydrogen ion exchange membrane on the stability of nucleic acids was determined. First, electrolysis was performed in the same manner as in Example 1, except that 10 μl of a 55 mM Na$_2$SO$_4$ aqueous solution (pH 6) containing 10$^5$ copy/μl of *E. coli* genome DNA (about 4 Mb) extracted from an *E. coli* BL21 strain culture using a Qiagen Blood & Cell culture kit was added to the third chamber 80. The obtained solutions in the third chamber 80 were substituted with the solution of the second chamber and 10 μl of an aqueous solution (pH 6) containing 55 mM Na$_2$SO$_4$ was put into the empty third chamber 80 and further electrolyzed. The amount of DNA was measured after real-time PCR was performed using primers of SEQ ID NOS: 1 and 2 using 10 μl of the obtained second chamber solution as a template. DNA was quantified by obtaining a crossing point (Cp) value through the quantitative PCR and using the difference between the Cp values.

Next, the stability of DNA was identified after comparing the amount of DNA remaining after the pH regulation with the initial amount of DNA. As a result, it was found that the stability of DNA was 91% when 7 V was applied for 30 seconds.

The pH levels according to the applied voltage and the amount of time the voltage was applied, and the DNA stability measured when 7 V was applied for 30 seconds are illustrated in Table 3.

TABLE 3

| | Voltage & applied period of time | | | DNA stability |
|---|---|---|---|---|
| | 5 V, 30 seconds | 7 V, 30 seconds | 10 V, 20 seconds | 7 V, 30 seconds |
| Average pH or stability | 13.0 | 2.49 | 2.39 | 91% |
| Standard Deviation | 0.00 | 0.08 | 0.13 | 0.07 |
| Covariance (CV) (%) | 0.00 | 3.22 | 5.45 | 7.30 |

The DNA stability was identified by measuring the remaining amount of DNA in each chamber after a voltage was applied across the first and second chambers including nucleic acids for a predetermined period of time. A device including only sodium ion exchange membranes was used as a control.

Figure 4:
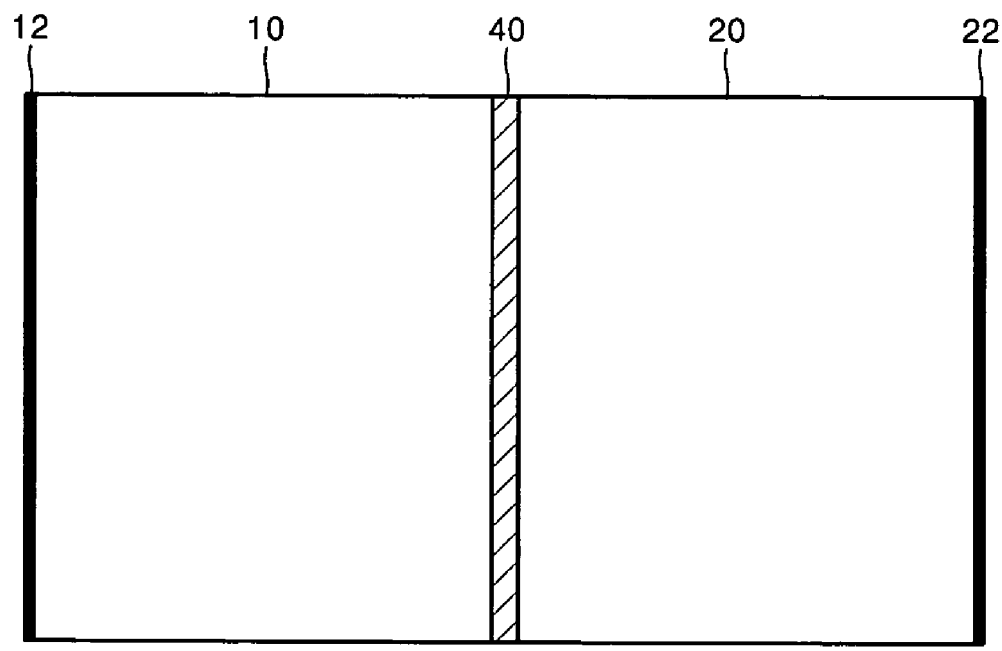
FIG. 4 illustrates a microfluidic device including only sodium ion exchange membranes for regulating pH through electrolysis.

FIG. 4 illustrates a microfluidic device including only sodium ion exchange membranes regulating pH through electrolysis. The device includes: a first chamber 10 with a first electrode 12 and sodium ion exchange membrane 40 at opposite ends thereof; and a second chamber 20 with a second electrode 22 and the sodium ion exchange membrane 40 at opposite ends thereof. The sodium ion exchange membrane 40 is interposed between the first and second chambers. The sodium ion exchange membrane was composed of Nafion™ with a size of and 2 mm×2.5 mm and including a functional group of —SO$_3$Na on its surface. The volume of each chamber of the microfluidic device in FIG. 4 was 10 μl. Each of the first and second electrodes 12 and 22 had an area of 2 mm×2.5 mm and was composed of platinum.

First, 10 μl of a 55 mM Na$_2$SO$_4$ aqueous solution (pH 6) containing 10$^5$ copy/μl of *E. coli* genome DNA (about 4 Mb) extracted from an *E. coli* BL21 strain culture using a Qiagen Blood & Cell culture kit was added to the first and second chambers. A micro pH electrode manufactured by Orion and a pH test paper were used for the pH measurement.

Next, a negative voltage was applied to the first electrode and a positive voltage was applied to the second electrode. The pH of the solutions in the chambers was measured after 3, 5, 7 and 9 V were applied to between the electrodes for a predetermined period of time. At the same time, DNA was quantified and the stability of DNA was identified. DNA was quantified using the method described in Example 1. The results are shown in FIGS. 5 and 6.

Figure 5:
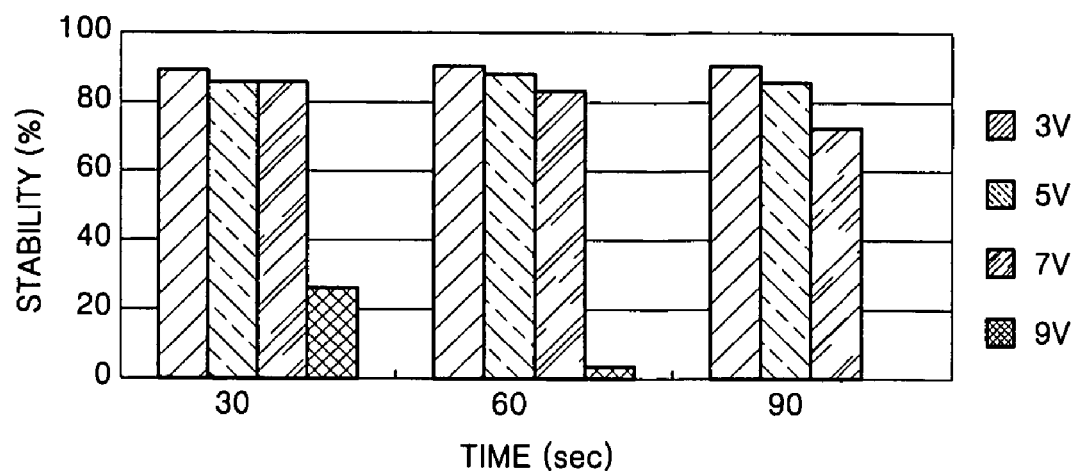
FIG. 5 is a graph of DNA stability when DNA is included in the first chamber of the microfluidic device of FIG. 4 and the pH is regulated using electrolysis.

FIG. 5 is a graph of the DNA stability when DNA is included in the first chamber comprising the cathode electrode, that is, the negative electrode, of the microfluidic device without the hydrogen ion exchange membrane, and the pH is regulated using electrolysis.

Figure 6:
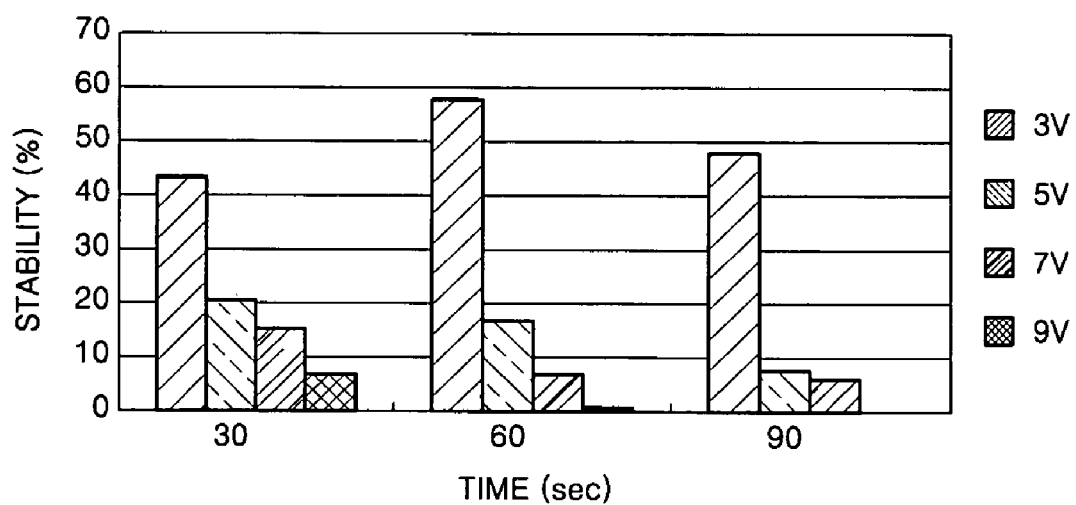
FIG. 6 is a graph of DNA stability when DNA is included in the second chamber of the microfluidic device of FIG. 4 and the pH is regulated using electrolysis.

FIG. 6 is a graph of the DNA stability when DNA is included in the second chamber comprising the anode electrode, that is, the positive electrode, of the microfluidic device without the hydrogen ion exchange membrane, and the pH is regulated using electrolysis.

As illustrated in FIGS. 5 and 6, the DNA stability of the first chamber comprising the positive electrode was remarkably lower than the DNA stability of the second chamber comprising the negative electrode. Specifically, when 7 V was applied for 30 seconds with the negative voltage applied to the first electrode and the positive voltage applied to the second electrode, the stability of the second chamber DNA was about 15%. This is substantially lower than the DNA stability of 91% measured after 7 V was applied for 30 seconds using the microfluidic device having the hydrogen ion exchange membrane of an embodiment of the present invention.

The decreased stability is assumed to have been caused by the absorption of nucleic acids by the positive electrode when the positive voltage is applied to the electrode in the chamber including the nucleic acids.

According to the above Examples, the stability of nucleic acids can be remarkably increased by interposing the hydrogen ion exchange membrane between the chambers when the positive voltage is applied to the electrode disposed in the chamber including the nucleic acids.

According to a microfluidic device for electrically regulating the pH of a fluid of the present invention, the pH of the microfluidic device can be rapidly regulated and the stability of nucleic acids can be maintained.

Also, according to a method of the present invention, the pH of a solution in the microfluidic device can be rapidly regulated and the stability of nucleic acids can be maintained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of electrically regulating the pH of a fluid in a microfluidic device, the microfluidic device comprising a first chamber comprising a first electrode, a second chamber comprising a second electrode, and a third chamber comprising a third electrode;

the method comprising:
   injecting a solution containing an ion having a lower standard oxidation potential than water into the first chamber of the microfluidic device;
   injecting a solution containing an ion having a lower standard reduction potential than water into the second chamber;
   applying a positive voltage to the first electrode of the first chamber and a negative voltage to the second electrode of the second chamber to induce electrolysis of water in the first and second chambers; and
   applying a negative voltage to the first electrode of the first chamber and a positive voltage to the third electrode of the third chamber, thereby regulating the pH of a solution in the second or first chamber, wherein the microfluidic device further comprises
   a metal ion exchange membrane interposed between the first and second chambers, whereby a portion of the first chamber and the second chamber is composed of the metal ion exchange membrane; and
   a hydrogen ion exchange membrane interposed between the second chamber and the third chamber, whereby a portion of the second chamber and the third chamber is composed of the hydrogen ion exchange membrane.

2. The method of claim 1, wherein the metal ion exchange membrane is an alkali metal ion exchange membrane.

3. The method of claim 2, wherein the metal ion exchange membrane is a sodium ion exchange membrane.

4. The method of claim 2, wherein the metal ion exchange membrane contains a functional group having —$SO_3M$ or —COOM, or —$SO_3M$ and —COOM on its surface, wherein M is an alkali metal.

5. The method of claim 1, wherein the regulation of the pH depends on the direction, magnitude and period of the applied voltage.

* * * * *